(12) United States Patent
Lee

(10) Patent No.: US 11,885,534 B2
(45) Date of Patent: Jan. 30, 2024

(54) COOLING DEVICE AND VEHICLE INCLUDING THE SAME

(71) Applicants: HYUNDAI MOTOR COMPANY, Seoul (KR); KIA CORPORATION, Seoul (KR)

(72) Inventor: Min Jae Lee, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/409,395

(22) Filed: Aug. 23, 2021

(65) Prior Publication Data
US 2022/0203806 A1   Jun. 30, 2022

(30) Foreign Application Priority Data
Dec. 31, 2020   (KR) .................. 10-2020-0189346

(51) Int. Cl.
| | |
|---|---|
| F25B 21/02 | (2006.01) |
| F24F 5/00 | (2006.01) |
| F25B 21/04 | (2006.01) |
| B60H 1/00 | (2006.01) |

(52) U.S. Cl.
CPC ............ F25B 21/02 (2013.01); F24F 5/0042 (2013.01); B60H 1/00478 (2013.01); F25B 21/04 (2013.01)

(58) Field of Classification Search
CPC ....... B60H 1/32; B60H 1/00478; F25B 21/02; F25B 21/04; F25B 23/003; F24F 5/0042
See application file for complete search history.

(56) References Cited

U.S. PATENT DOCUMENTS

| | | | |
|---|---|---|---|
| 5,405,680 | A | 4/1995 | Chang et al. |
| 2011/0061400 | A1 | 3/2011 | Park et al. |

FOREIGN PATENT DOCUMENTS

| | | | | |
|---|---|---|---|---|
| CN | 1760606 | A | * 4/2006 | ......... B60H 1/00428 |
| JP | 60213519 | A | 10/1985 | |
| KR | 19940000718 | B1 | 1/1994 | |
| KR | 20100056811 | A | * 5/2010 | |
| KR | 102029989 | B1 | 11/2019 | |
| WO | WO-8900268 | A1 | * 2/1989 | ............ F24F 5/0089 |

OTHER PUBLICATIONS

Machine translation for KR 20100056811 (Year: 2010).*
Machine translation for CN 1760606 (Year: 2010).*
Machine translation of JP 60213519 (Year: 1985).*
Machine translation of WO8900268 (Year: 1989).*
Extended European Search Report for European Application No. 21192316.4, dated Dec. 7, 2021.

* cited by examiner

*Primary Examiner* — Joseph F Trpisovsky
(74) *Attorney, Agent, or Firm* — MCDONNELL BOEHNEN HULBERT & BERGHOFF LLP

(57) ABSTRACT

Disclosed are a cooling device and a vehicle including the same. The cooling device according to one aspect of the present disclosure includes a housing part having a first hole formed at one side thereof and a second hole formed at the other side thereof, a heat exchange part accommodated in an internal space of the housing part and having one side communicating with the first hole and the other side communicating with the second hole, a thermoelectric element part provided above the heat exchange part, and a radiational cooling part provided above the thermoelectric element part and at least partially exposed to the outside.

12 Claims, 6 Drawing Sheets

US 11,885,534 B2

COOLING DEVICE AND VEHICLE INCLUDING THE SAME

CROSS-REFERENCE TO RELATED APPLICATION

This application claims priority to and the benefit of Korean Patent Application No. 10-2020-0189346 filed in the Korean Intellectual Property Office on Dec. 31, 2020, the entire contents of which are incorporated herein by reference.

TECHNICAL FIELD

The present disclosure relates to a cooling device and a vehicle including the same.

BACKGROUND ART

In the related art, a separate cooling device is provided in a vehicle to cool an internal space or the like of the vehicle. Examples of the cooling device may include an HVAC (Heating, Ventilation, & Air Conditioning) system.

In the related art, however, the cooling device mounted in the vehicle cools the internal space of the vehicle by dissipating heat in the vehicle to the outside of the vehicle while consuming separate power. Such a cooling device is not desirable in terms of energy consumption. Further, a separate space is required to mount the cooling device, such as the HVAC system, in the vehicle, which is undesirable in terms of spatial utilization of the vehicle.

SUMMARY

The present disclosure has been made in an effort to provide a cooling device for a vehicle that may perform a cooling function without using separate power and maximize spatial utilization of a vehicle.

In one aspect, the present disclosure provides a cooling device including: a housing part having a first hole formed at one side thereof and a second hole formed at the other side thereof, a heat exchange part accommodated in an internal space of the housing part and having one side communicating with the first hole and the other side communicating with the second hole, a thermoelectric element part provided above the heat exchange part, and a radiational cooling part provided above the thermoelectric element part and at least partially exposed to the outside.

The thermoelectric element part may be accommodated in the internal space of the housing part.

An upper surface of the heat exchange part may be in close contact with a lower surface of the thermoelectric element part.

An upper surface of the thermoelectric element part may be in close contact with a lower surface of the radiational cooling part.

The cooling device may further include a cover part provided above the radiational cooling part, a through-hole may be provided in a central region of the cover part, and the radiational cooling part may be exposed to the outside through the through-hole.

The cover part may include an inclined region inclined downward from a peripheral region toward the central region of the cover part.

The inclined region may have a vertical cross-section with a straight shape.

The inclined region may have a vertical cross-section with a curved shape.

The heat exchange part may include recessed regions each having a recessed shape and protruding regions each having a protruding shape, and the recessed regions and the protruding regions may be disposed alternately in a direction from the first hole toward the second hole.

The heat exchange part may further include connection regions each configured to connect the recessed region and the protruding region, and the connection regions may have flow path holes through which a fluid passes.

The flow path holes, which are provided, respectively, in the two connection regions facing each other among the plurality of the connection regions, may be different in height in a vertical direction from each other.

The radiational cooling part may have a film shape.

In another aspect, the present disclosure provides a vehicle including: a cooling device, in which the cooling device includes: a housing part having a first hole formed at one side thereof and a second hole formed at the other side thereof; a heat exchange part accommodated in an internal space of the housing part and having one side communicating with the first hole and the other side communicating with the second hole; a thermoelectric element part provided above the heat exchange part; and a radiational cooling part provided above the thermoelectric element part and at least partially exposed to the outside.

The cooling device may be provided on an outer surface of the vehicle.

The present disclosure may provide the cooling device for a vehicle that may perform a cooling function without using separate power and maximize spatial utilization of the vehicle.

DETAILED DESCRIPTION

Hereinafter, a cooling device and a vehicle according to the present disclosure will be described with reference to the drawings.

Cooling Device

Figure 1:
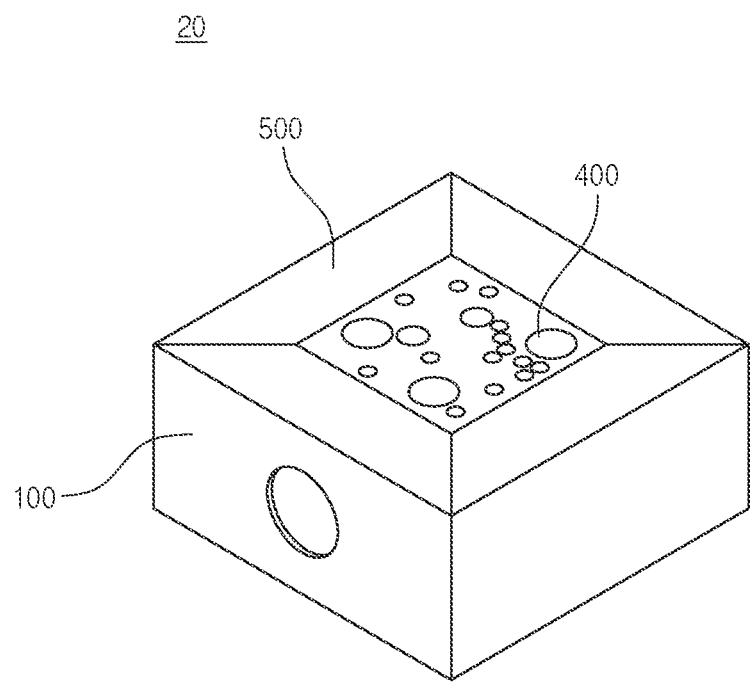
FIG. 1 is a perspective view illustrating a cooling device according to the present disclosure.
Figure 2:
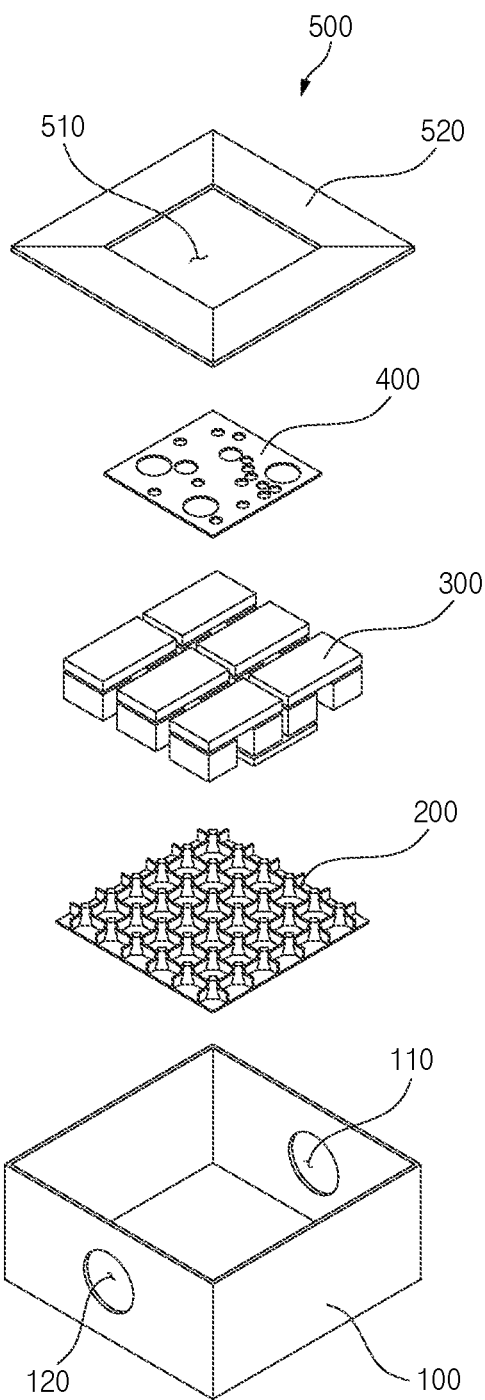
FIG. 2 is an exploded perspective view illustrating the cooling device according to the present disclosure.
Figure 3:
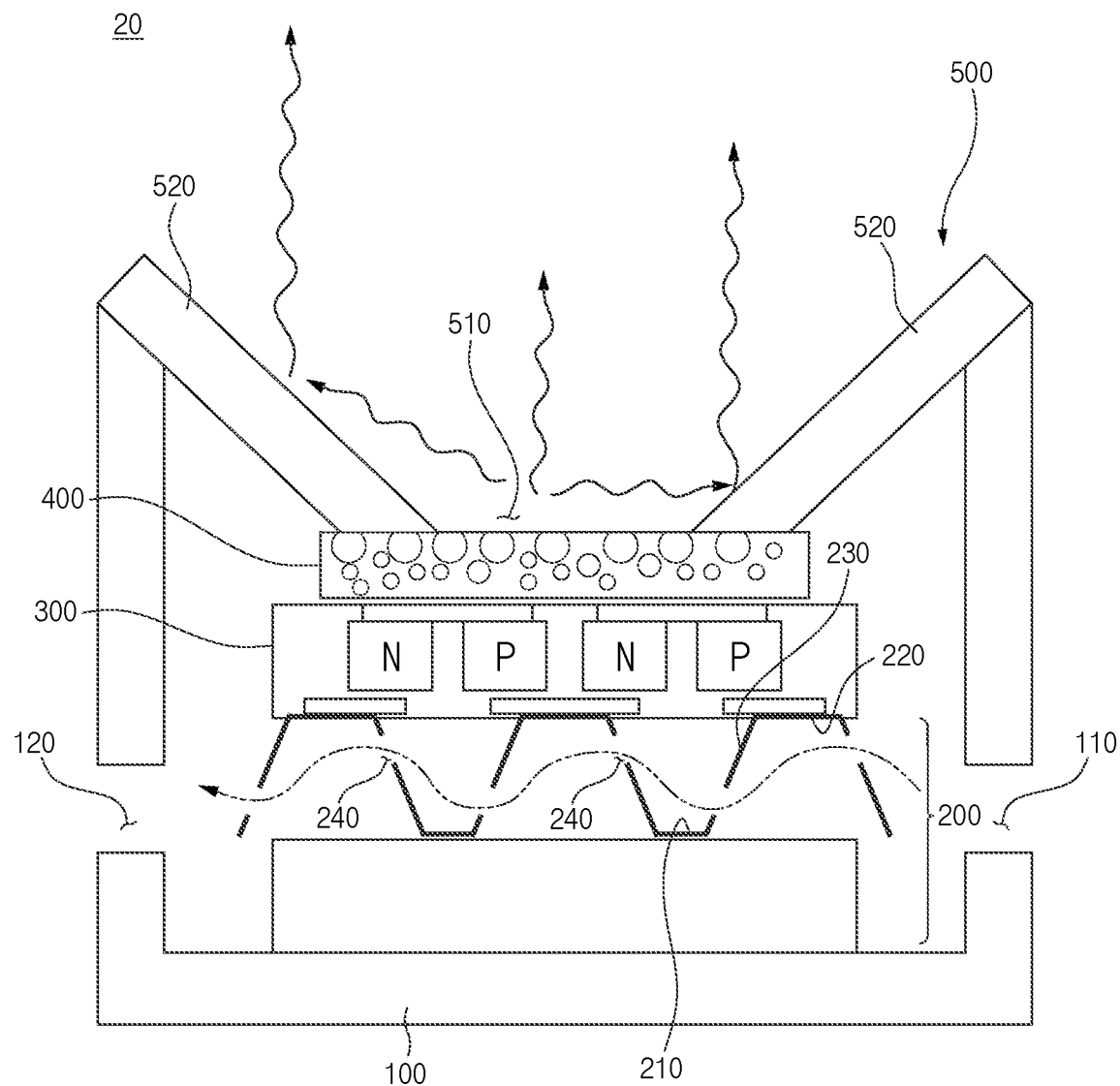
FIG. 3 is a vertical cross-sectional view illustrating a cooling device according to one embodiment of the present disclosure.

FIG. 1 is a perspective view illustrating a cooling device according to the present disclosure, and FIG. 2 is an exploded perspective view illustrating the cooling device according to the present disclosure. In addition, FIG. 3 is a vertical cross-sectional view illustrating a cooling device according to one embodiment of the present disclosure.

A cooling device 20 according to the present disclosure may be configured to cool an internal space of a vehicle.

In more detail, the cooling device 20 may include a housing part 100. The housing part 100 may define a body of the cooling device 20 and serve to protect spaces provided in the cooling device 20 from the outside. As described below, several components of the cooling device 20 may be accommodated in the internal space of the housing part 100.

Meanwhile, holes may be provided in lateral surfaces of the housing part 100. The holes may define a path through which a cooling fluid (e.g., a refrigerant such as air) is introduced into the cooling device 20 and also define a path through which the fluid is discharged from the cooling device 20.

In further detail, a first hole 110 may be provided at one side of the housing part 100, and a second hole 120 may be provided at the other side of the housing part 100. FIGS. 1 to 3 illustrate that the first hole 110 and the second hole 120 are provided at one side and the other side of the housing part 100, respectively.

In addition, the cooling device 20 may further include a heat exchange part 200 accommodated in the internal space of the housing part 100. According to the present disclosure, the fluid, which is introduced into the cooling device 20 through the first hole 110 of the housing part 100, may be cooled while passing through the heat exchange part 200 and then discharged to the outside through the second hole 120. To this end, as illustrated in FIG. 3, one side of the heat exchange part 200 may communicate with the first hole 110, and the other side of the heat exchange part 200 may communicate with the second hole 120.

In addition, the cooling device 20 may further include a thermoelectric element part 300 provided above the heat exchange part 200. The thermoelectric element part 300 may be configured to cool the fluid using the Peltier effect. That is, according to the present disclosure, as a potential difference is created in the thermoelectric element part 300, the electric current flows in one direction, and thus heat also flows in one direction. As a result, a temperature at an upper region of the thermoelectric element part 300 may increase, and a temperature at a lower region of the thermoelectric element part 300 may decrease. In this case, the fluid flowing in the heat exchange part 200 exchanges heat with the lower region of the thermoelectric element part 300, and thus a temperature of the fluid also decreases. Similar to the heat exchange part 200, the thermoelectric element part 300 may also be accommodated in the internal space of the housing part 100. In addition, an upper surface of the heat exchange part 200 may be in close contact with a lower surface of the thermoelectric element part 300. Therefore, the fluid flowing in the heat exchange part 200 may smoothly exchange heat with the thermoelectric element part 300.

Referring to FIGS. 1 to 3, the cooling device 20 may further include a radiational cooling part 400 provided above the thermoelectric element part 300 and at least partially exposed to the outside.

The radiational cooling part 400 may be configured to discharge heat in the cooling device 20 to the outside using radiational cooling. That is, as described above, thermal energy of the fluid flowing in the heat exchange part 200 is transferred to the thermoelectric element part 300. In this case, the thermal energy of the thermoelectric element part 300 is transferred to the radiational cooling part 400, and then the radiational cooling part 400 discharges the thermal energy, in the form of radiant heat, to the outside. In this case, an upper surface of the thermoelectric element part 300 may be in close contact with a lower surface of the radiational cooling part 400. In this case, the thermal energy of the thermoelectric element part 300 may be smoothly transferred to the radiational cooling part 400 by thermal conduction. In addition, the radiational cooling part 400 may have a film shape. In this case, a volume of the cooling device may be significantly decreased in comparison with a cooling device in the related art that has a heat sink such as a heat radiating fin.

In addition, the cooling device 20 according to the present disclosure may further include a cover part 500 provided above the radiational cooling part 400. In this case, as illustrated in FIGS. 2 and 3, a through-hole 510 may be formed in a central region of the cover part 500, and the radiational cooling part 400 may be exposed to the outside through the through-hole 510.

The cover part 500 may have various shapes. In further detail, according to the present disclosure, the cover part 500 may include an inclined region 520 inclined downward from a peripheral region toward the central region of the cover part 500, i.e., toward the through-hole 510. In this case, according to the embodiment of the present disclosure, the inclined region 520 may have a vertical cross-section with a straight shape, as illustrated in FIG. 3.

Figure 4:
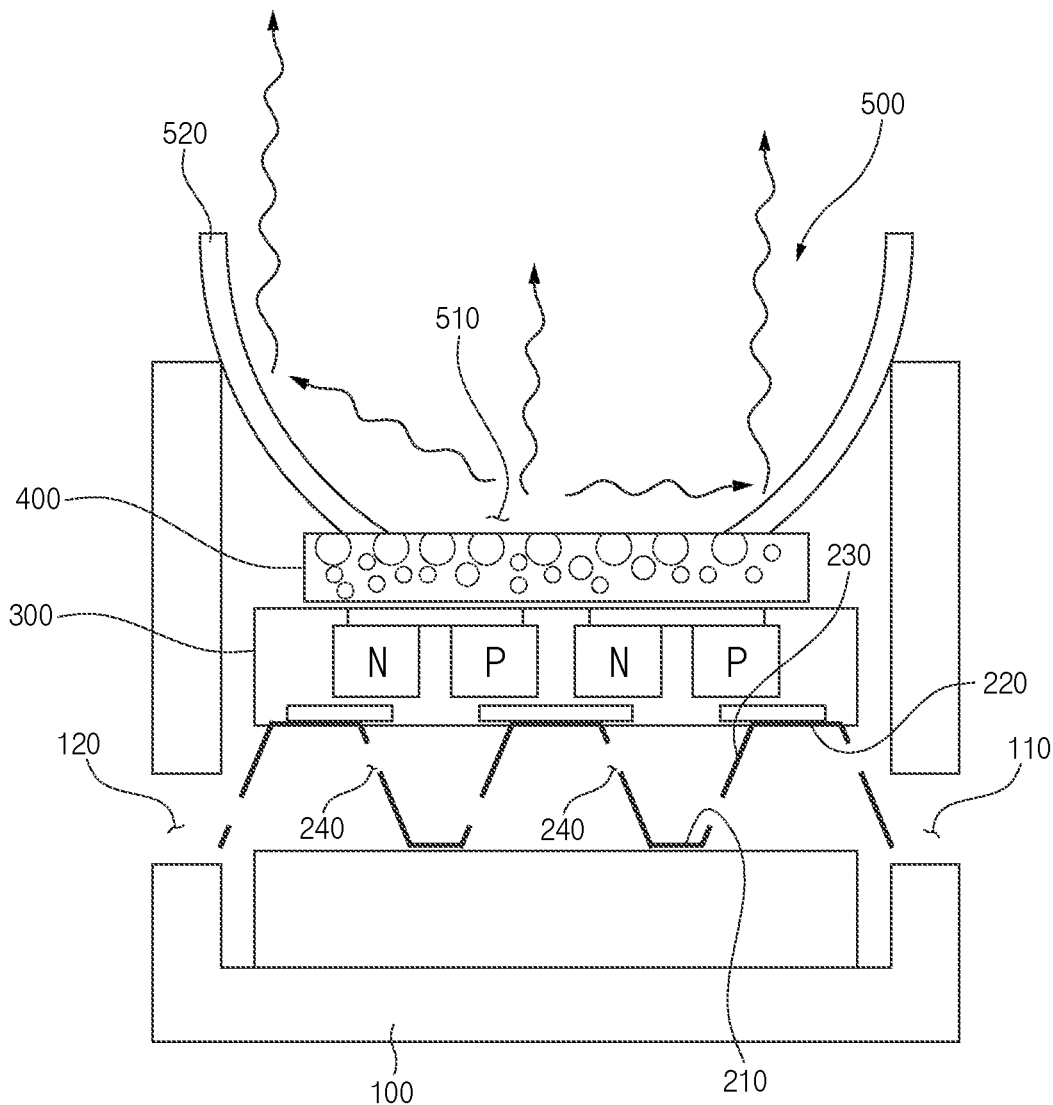
FIG. 4 is a vertical cross-sectional view illustrating a cooling device according to another embodiment of the present disclosure.

FIG. 4 is a vertical cross-sectional view illustrating a cooling device according to another embodiment of the present disclosure.

According to another embodiment of the present disclosure, the inclined region 520 may have a vertical cross-section with a curved shape, as illustrated in FIG. 4. For example, the inclined region 520 may have a shape corresponding to a part of a parabola.

The inclined region 520 provided in the cover part 500 may be configured to collect radiant energy discharged from the radiational cooling part 400 and then to effectively transfer the collected radiant energy toward the location above the cover part 500. For example, if an upper surface of the cover part 500 is flat, a part of the radiant energy discharged from the radiational cooling part may propagate in a horizontal direction instead of being discharged upward and reach other adjacent radiational cooling parts, which may have an adverse effect on the efficiency of the cooling device. However, according to the present disclosure, the cover part 500 has the inclined region 520 that may prevent the radiant energy discharged from the radiational cooling part 400 from propagating in the horizontal direction, thereby significantly improving the efficiency of the cooling device 20.

Meanwhile, the heat exchange part 200 of the cooling device 20 according to the present disclosure may be divided into a plurality of regions depending on a shape thereof. In more detail, referring to FIGS. 3 and 4, the heat exchange part 200 may include recessed regions 210 each having a shape recessed downward, protruding regions 220 each having a shape protruding upward, and connection regions 230 each connecting the recessed region and the protruding region. In more detail, the recessed regions 210 and the protruding regions 220 may be disposed alternately in one direction. For example, FIG. 3 illustrates that the recessed regions 210 and the protruding regions 220 are alternately disposed in a direction from the first hole 110 toward the second hole 120 of the housing part 100.

Referring to FIGS. 3 and 4, flow path holes 240 may be provided in the connection regions 230 of the heat exchange part 200 and define paths through which the fluid passes. Therefore, according to the present disclosure, i) the fluid may be introduced into the cooling device 20 through the first hole 110 of the housing part 100, ii) the fluid may be cooled by exchanging heat with the thermoelectric element part 300 while flowing in the heat exchange part 200 through the flow path holes 240 of the heat exchange part 200, and then iii) the fluid may be discharged from the cooling device 20 through the second hole 120 of the housing part 100.

Meanwhile, according to the present disclosure, the flow path hole 240 may be provided in each of the plurality of connection regions 230. In this case, the flow path holes 240, which are provided, respectively, in the two connection regions facing each other with the recessed region 210 or the protruding region 220 interposed therebetween among the plurality of connection regions 230, may be different in height in a vertical direction from each other. In comparison with a case in which the plurality of flow path holes 240 has the same height, a length of the flow path through which the fluid flows in the internal space of the heat exchange part 200 increases according to the present disclosure, and thus the amount of time which the fluid stays in the heat exchange part 200 also increases. Therefore, the magnitude of the thermal energy transferred to the thermoelectric element part 300 by the fluid may also increase.

Figure 5:
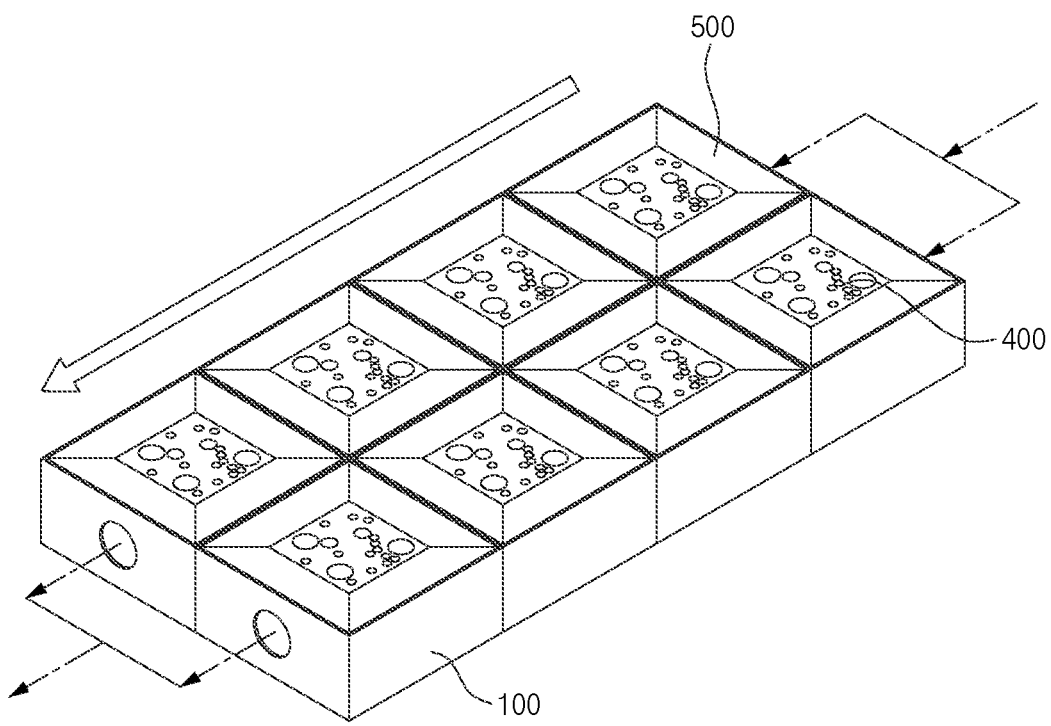
FIG. 5 is a perspective view illustrating a plurality of components provided in the cooling device according to the present disclosure.

FIG. 5 is a perspective view illustrating that a plurality of components is provided in the cooling device according to the present disclosure.

Meanwhile, referring to FIGS. 1 to 5, each of the heat exchange part 200, the thermoelectric element part 300, the radiational cooling part 400, and the cover part 500 may be provided in plural in the single housing part 100 of the cooling device 20 according to the present disclosure to increase a cooling capacity thereof.

Vehicle

Figure 6:
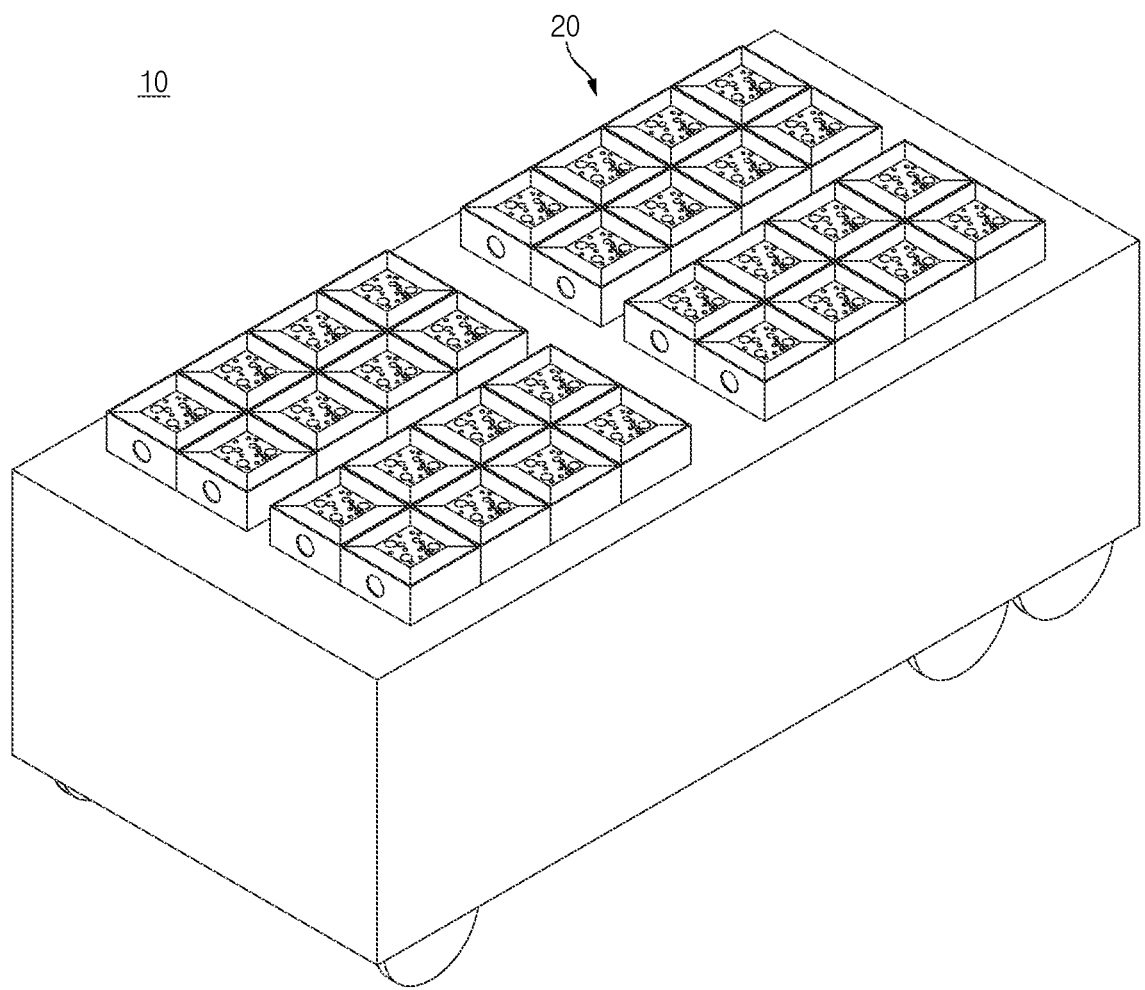
FIG. 6 is a perspective view illustrating a vehicle including the cooling device according to the present disclosure.

FIG. 6 is a perspective view illustrating a vehicle including the cooling device according to the present disclosure.

A vehicle 10 according to the present disclosure may include the cooling device 20. In this case, the cooling device 20 may include the housing part 100 having the first hole 110 formed at one side thereof and the second hole 120 having the other side thereof, the heat exchange part 200 accommodated in the internal space of the housing part 100 and having one side communicating with the first hole 110 and the other side communicating with the second hole 120, the thermoelectric element part 300 provided above the heat exchange part 200, and the radiational cooling part 400 provided above the thermoelectric element part 300 and at least partially exposed to the outside.

In this example embodiment, the cooling device 20 may be provided on an outer surface of the vehicle 10. For example, as illustrated in FIG. 6, the cooling device 20 may be provided on an upper surface of the vehicle 10.

The present disclosure has been described with reference to the limited embodiments and the drawings, but the present disclosure is not limited thereto. The present disclosure may be carried out in various forms by those skilled in the art to which the present disclosure pertains within the technical spirit of the present disclosure and within the scope equivalent to the appended claims.

What is claimed is:

1. A cooling device comprising:
a housing part having a first hole formed at one side thereof and a second hole formed at the other side thereof;
a heat exchange part accommodated in an internal space of the housing part and having one side communicating with the first hole and the other side communicating with the second hole;
a thermoelectric element part provided above the heat exchange part; and
a radiational cooling part provided above the thermoelectric element part and at least partially exposed to the outside of the housing party; and
a cover part provided above the radiational cooling part,
wherein the radiational cooling part discharges in a form of radiant heat at least of a thermal energy transferred from the thermoelectric element part to the outside of the housing part, the thermal energy transferred from the thermoelectric element part being transferred from a fluid flowing in the heat exchange part,
wherein a through-hole is provided in a central region of the cover part, and the radiational cooling part is exposed to the outside through the through-hole,
wherein the cover part comprises an inclined region inclined downward from a peripheral region toward the central region of the cover part,
wherein a width of the peripheral region in a first direction is greater than a width of the central region in the first direction,
wherein the first direction is perpendicular to a vertical direction.

2. The cooling device of claim 1, wherein the thermoelectric element part is accommodated in the internal space of the housing part.

3. The cooling device of claim 1, wherein an upper surface of the heat exchange part is in close contact with a lower surface of the thermoelectric element part.

4. The cooling device of claim 1, wherein an upper surface of the thermoelectric element part is in close contact with a lower surface of the radiational cooling part.

5. The cooling device of claim 1, wherein the inclined region has a vertical cross-section with a straight shape.

6. The cooling device of claim 1, wherein the inclined region has a vertical cross-section with a curved shape.

7. The cooling device of claim 3, wherein the heat exchange part comprises:
recessed regions each having a recessed shape; and
protruding regions each having a protruding shape,
wherein the recessed regions and the protruding regions are disposed alternately in a direction from the first hole toward the second hole.

8. The cooling device of claim 7, wherein the heat exchange part further comprises connection regions each configured to connect the recessed regions and the protruding regions, the connection regions having flow path holes through which the fluid passes.

9. The cooling device of claim 8, wherein the flow path holes, which are provided, respectively, in the two connection regions facing each other among the plurality of the connection regions, are different in height in the vertical direction from each other.

10. The cooling device of claim 1, wherein the radiational cooling part has a film shape.

11. A vehicle comprising:
a cooling device,
wherein the cooling device comprises:
a housing part having a first hole formed at one side thereof and a second hole formed at the other side thereof;
a heat exchange part accommodated in an internal space of the housing part and having one side communicating with the first hole and the other side communicating with the second hole;
a thermoelectric element part provided above the heat exchange part; and a radiational cooling part provided above the thermoelectric element part and at least partially exposed to the outside of the housing part, and a cover part provided above the radiational cooling part, wherein the radiational cooling part discharges in a form of radiant heat at least of a thermal energy transferred from the thermoelectric element part to the outside of the housing part, the thermal energy transferred from the thermoelectric element part being transferred from a fluid flowing in the heat exchange part, wherein a through-hole is provided in a central region of the cover part, and the radiational cooling part is exposed to the outside through the through-hole, wherein the cover part comprises an inclined region inclined downward from a peripheral region toward the central region of the cover part, wherein a width of the peripheral region in a first direction is greater than a width of the central region in the first direction, wherein the first direction is perpendicular to a vertical direction.

12. The vehicle of claim 11, wherein the cooling device is provided on an outer surface of the vehicle.

* * * * *